US009036639B2

(12) United States Patent
Zhang

(10) Patent No.: US 9,036,639 B2
(45) Date of Patent: May 19, 2015

(54) SYSTEM AND METHOD FOR VXLAN INTER-DOMAIN COMMUNICATIONS

(71) Applicant: Futurewei Technologies, Inc., Plano, TX (US)

(72) Inventor: Hong Zhang, Palo Alto, CA (US)

(73) Assignee: Futurewei Technologies, Inc., Plano, TX (US)

( * ) Notice: Subject to any disclaimer, the term of this patent is extended or adjusted under 35 U.S.C. 154(b) by 148 days.

(21) Appl. No.: 13/689,633

(22) Filed: Nov. 29, 2012

(65) Prior Publication Data

US 2014/0146817 A1 May 29, 2014

(51) Int. Cl.
*H04L 12/56* (2006.01)
*H04L 12/741* (2013.01)

(52) U.S. Cl.
CPC ..................................... *H04L 45/74* (2013.01)

(58) Field of Classification Search
CPC ..... H04L 45/74; H04L 45/00; H04L 29/0653; H04L 49/3009; H04L 47/10; H04L 29/06
USPC .......................................................... 370/392
See application file for complete search history.

(56) References Cited

U.S. PATENT DOCUMENTS

2013/0124750 A1* 5/2013 Anumala et al. .............. 709/232
2013/0170490 A1* 7/2013 Kreeger et al. ............... 370/390
2013/0308641 A1* 11/2013 Ackley .......................... 370/392
2013/0322446 A1* 12/2013 Biswas et al. ................ 370/392

OTHER PUBLICATIONS

"Scalable Cloud Networking with Cisco Nexus 1000V Series Switches and VXLAN", Cisco: White Paper, Mar. 2012, p. 2.*
"Scalable Cloud Networking with Cisco Nexus 1000V Series Switches and VXLAN," Cisco: White Paper, Mar. 2012, pp. 1-6.
Mahalingam, M., et al., "VXLAN: A Framework Overlaying Virtualized Layer 2 Networks over Layer 3 Networks," Network Working Group, Internet Draft, Aug. 22, 2012, pp. 1-20.

* cited by examiner

*Primary Examiner* — Charles C Jiang
*Assistant Examiner* — Thad Defauw
(74) *Attorney, Agent, or Firm* — Slater & Matsil. L.L.P.

(57) ABSTRACT

VXLAN inter-domain communications and packet forwarding are supported between a virtual machine (VM) in a Virtual eXtensible Local Area Network (VXLAN) domain and an external client or another domain via a Layer Two (L2)/Layer Three (L3) switch, router, or network. A VXLAN Tunnel End Point (VTEP) coupled to the VM at a server and to the L2/L3 switch, router, or network and associated with the VXLAN domain is configured to implement a method for enabling the VXLAN inter-domain communications. The method includes receiving a packet at the (VTEP), replacing a source or destination Media Access Control (MAC) address in the packet if the packet is part of communications between a VXLAN domain for the VMs and an external component without encapsulating or decapsulating the packet, and forwarding the packet. Alternatively, the VTEP encapsulates or decapsulates an incoming packet if the packet is part of a VXLAN internal domain communications.

19 Claims, 4 Drawing Sheets

200
225
L2/L3 NETWORK
250
SERVER
IP ADDRESS RANGE DATABASE
256
PACKET
VTEP
252
VM
VM
VM
254
254
254
260
VXLAN ENCAPSULATION
270
ORIGINAL ETHERNET FRAME
OUTER MAC DA
261
OUTER MAC SA
262
OUTER IEEE 802.1Q
263
OUTER IP DA
264
OUTER IP SA
265
OUTER UDP
266
VXLAN ID (24 BITS)
267
INNER MAC DA
271
INNER MAC SA
272
OPTIONAL INNER IEEE 802.1Q
273
ORIGINAL ETHERNET PAYLOAD
274
CRC
275

SYSTEM AND METHOD FOR VXLAN INTER-DOMAIN COMMUNICATIONS

TECHNICAL FIELD

The present invention relates to a system and method for network communications, and, in particular embodiments, to a system and method for VXLAN inter-domain communications.

BACKGROUND

Server virtualization poses issues in data center networks, such as having the range of virtual network restricted to L2 domain, Media Access Control (MAC) address table overflow on Ethernet switches, and limited IDs to partition traffic for different virtual machines (VMs). Virtual eXtensible Local Area Network (VXLAN) is an overlay technology that addresses the above issues. Specifically, VXLAN is a new network virtualization technology to segregate traffic in a physical data network into multiple virtual networks. The technology is described in IETF specification in draft-mahalingam-dutt-dcops-vxlan-02, entitled "VXLAN: A Framework for Overlaying Virtualized Layer 2 Networks over Layer 3 Networks," which is incorporated herein by reference.

VXLAN extends a L2 virtual network across L3 networks by tunneling the L2 MAC traffic from the individual VMs over the L3 Internet Protocol (IP) core network. Each VXLAN endpoint can encapsulate VM traffic into an IP tunnel upon egress and decapsulate VM traffic upon ingress. Thus, each individual VM's IP address is hidden to external switches, which mitigates the MAC address overflow issue on physical switches. Each encapsulated packet carries a 24 bit VXLAN ID, and hence the VM traffic can be classified into about 16 million partition domains which is sufficient to handle large traffic scenarios.

However, VXLAN encapsulation poses issues for communications between a VM in a VXLAN domain and an external client in a non-VXLAN domain. This is because after the VM packet is encapsulated with a VXLAN header, the VM's IP address becomes invisible to external routers or switches. Hence, external routers are not able to learn the VM's IP address and therefor cannot route a packet to a VM in a VXLAN domain. If an external client in a non-VXLAN domain needs to send out a packet to a VM, the external client sends the packet with an IP address destined to the VM and without VXLAN encapsulation. External routers/switches do not know how to route such a packet from a non-VXLAN domain entity to a VM in a VXLAN domain. The IETF specification for VXLAN does not address how a VM in a VXLAN domain communicates with an external client outside the VXLAN domain. A mechanism is needed to enable routers/switches to handle such scenarios and forward such packets properly.

SUMMARY OF THE INVENTION

In accordance with an embodiment, a method for supporting communications between a Virtual eXtensible Local Area Network (VXLAN) domain and an external component comprises receiving a packet at a VXLAN Tunnel End Point (VTEP) at a server comprising one or more virtual machines (VMs), determining whether the packet is part of a VXLAN internal domain communications for the VMs, replacing a Media Access Control (MAC) address in the packet if the packet is part of communications between a VXLAN domain for the VMs and an external component, and forwarding the packet.

In accordance with another embodiment, an apparatus for enabling communications between a VXLAN domain and an external component includes a VTEP configured to replace a MAC address in the packet without encapsulating and decapsulating the packet if the packet is part of communications between a VXLAN domain and an external component or another domain. The apparatus also includes one or more VMs associated with the VXLAN domain and coupled to the VTEP and an Internet Protocol (IP) address database (DB) coupled to the VTEP and comprising an IP address range assigned to the VXLAN domain.

In accordance with yet another embodiment, a network component for supporting communications between a VXLAN domain and an external component comprises a processor and a computer readable storage medium storing programming for execution by the processor. The programming includes instructions to receive a packet at a VTEP at a server comprising one or more VMs, determine whether the packet is part of a VXLAN internal domain communications for the VMs, replace a MAC address in the packet if the packet is part of communications between a VXLAN domain for the VMs and an external component without encapsulating or decapsulating the packet, and forward the packet.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
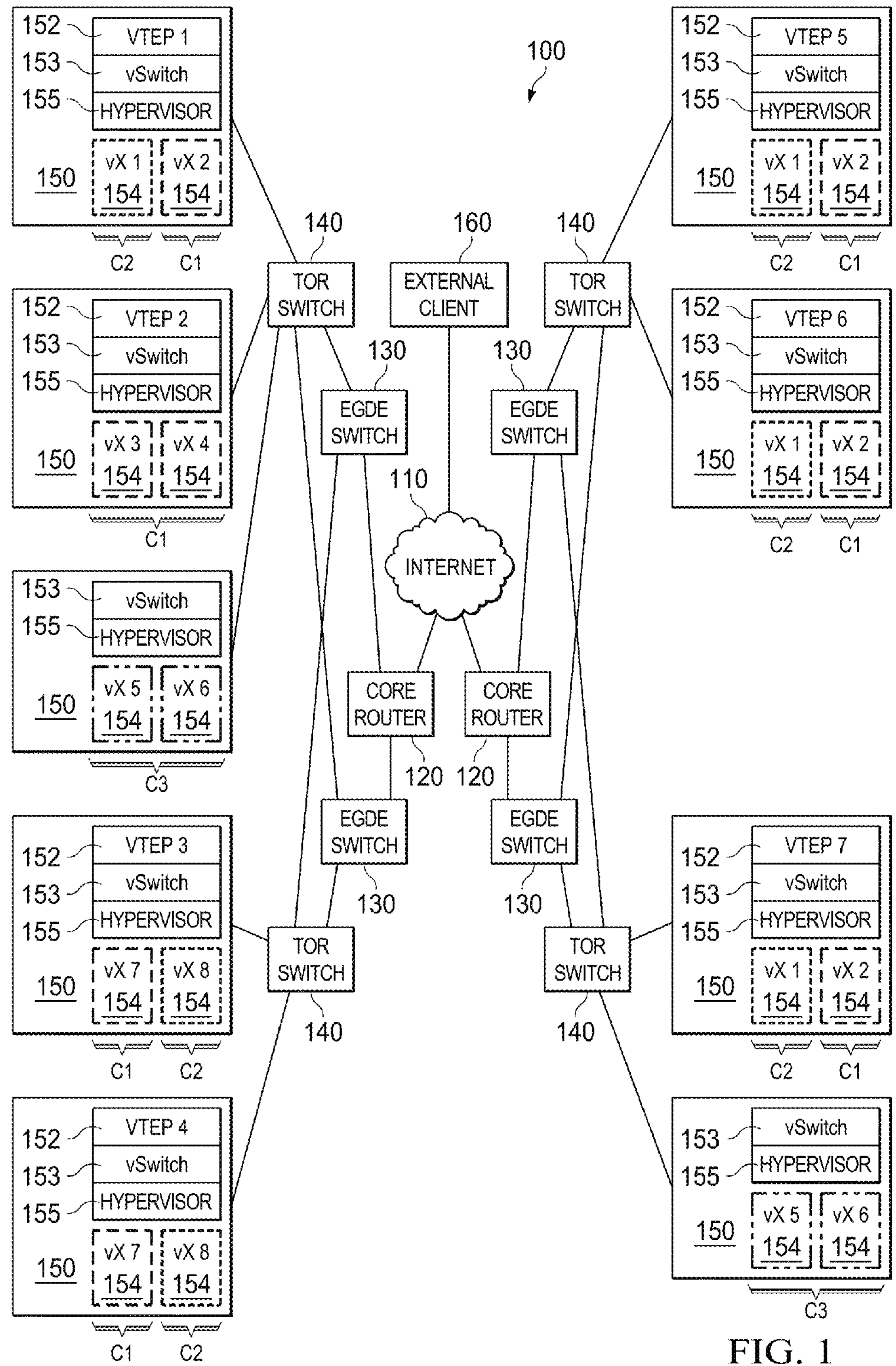
FIG. 1 is an example of a VXLAN communications architecture.

FIG. 1 shows an example of a VXLAN communications architecture 100. The VXLAN communications architecture 100 includes a plurality of physical servers 150 connected to each other and to other components in a hierarchy of networks/layers and links. The servers 150 may belong to one or more data centers (not shown). The servers 150 in the same data center (DC) are interconnected via top of rack (TOR) switches 140. The TOR switches 140 (e.g., in different DCs) are interconnected via edge switches 130, which may belong to one or more access networks (not shown). The edge switches 130 (e.g., in different networks) are interconnected via core routers 120, which may belong to one or more core networks (not shown). The core routers 120 (e.g., in different networks) are interconnected via the Internet 110 and/or other networks (e.g., IP networks). The TOR switches 140, edge switches 130, and core routers 120 may communicate with the servers 150 at L2 and L3 (e.g. Ethernet and IP layer).

A server 150 may comprise one or more VMs 154, a hypervisor 155, and a virtual switch (vSwitch) 153. At least some of the servers 150 may also use VXLAN technology and encapsulation and as such include a VXLAN Tunnel End Point (VTEP) 152 which contains the functionality needed to tunnel packets of VMs or other endpoints over L2/L3 networks. In this example, the VMs 154 belong to three different VXLAN domains. The three different groups of VMs 154 have different shade patterns in FIG. 1. Different VMs 154 at different servers 150 that are assigned to the same VXLAN domain can communicate with each other, e.g., via the TOR switches 140, the edge switches 130, and/or the core routers 120, without exposing the VM's IP addresses to the higher layer communications (L3). The VTEP 152 encapsulates L2 packets (e.g., Ethernet packets) from the VMs 154 by adding a VXLAN header (described below) that hides the VM's IP/MAC addresses from the L2/L3 switches/routers, such as the TOR switches 140, the edge switches 130, and the core routers 120. The VTEP 152 also decapsulates packets from the TOR switches 140 by removing the VXLAN header before forwarding the original L2 packets to the VMs 154.

The Internet 110 may also be coupled to one or more external clients 160, which may belong to a non-VXLAN domain (e.g., a VLAN domain) and hence does not perform VXLAN encapsulation/decapsulation. An external client 160 may send a packet without VXLAN encapsulation (a packet without a VXLAN header) that is destined to a VM 154 using the VM's IP address as a destination address in the packet. However, since the VMs' IP addresses are invisible to the core routers 120, edge switches 130, and TOR switches 120 (due to VXLAN encapsulation by the VTEP 152), these routers/switches are not able to forward the packet from the external client 160 to the destined VM 154 properly.

Disclosed herein are system and method embodiments for enabling communications between an external client in a non-VXLAN domain (e.g., the external client 160) and a VM in a VXLAN domain (e.g., a VM 154) in a network virtualization scenario, such as in the system 100. The embodiments include a VXLAN VTEP (e.g., at a server with one or more VMs) configured to determine whether an incoming packet or traffic is to be forwarded within the same VXLAN domain or between different domains. In the case of forwarding the packet between different domains, such as between a VXLAN domain and an external domain (e.g., a VLAN domain, another VXLAN domain or an external client), the VTEP does not performs typical VXLAN encapsulation/decapsulation of the packet. Additionally, the VTEP exposes the VM's IP address to external switches/routers but hides the VM's MAC address from external switches/routers by replacing the VM's MAC address with the VTEP's MAC address in communications between a VXLAN domain and the external domain. The VTEP can also use this scheme to forward packets or traffic between different VXLAN domains, e.g., through L3 switches and/or routers.

Figure 2:
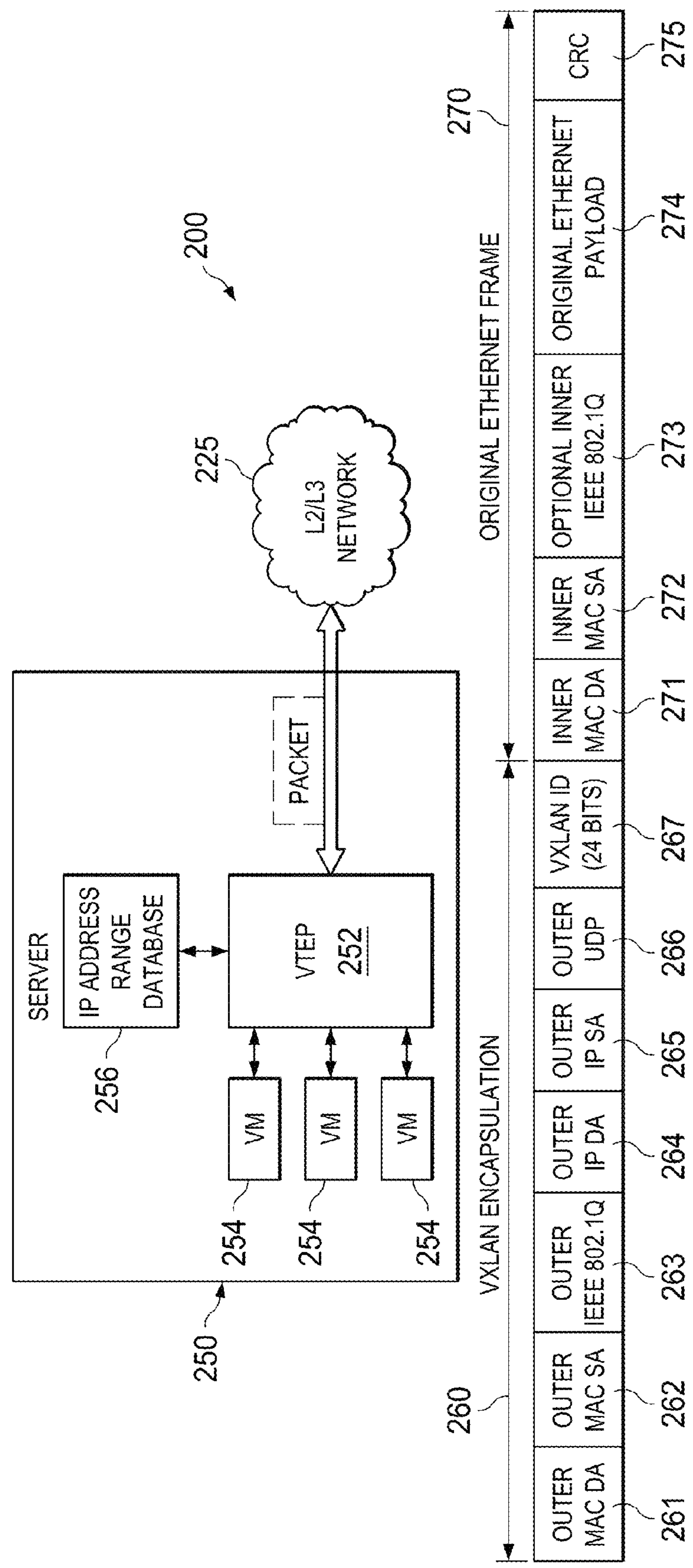
FIG. 2 is an embodiment system enabled for VXLAN inter-domain communications.

FIG. 2 illustrates an embodiment system 200 for VXLAN inter-domain communications (or communications between different domains). For instance, the system 200 enables communications between a VM in a local VXLAN domain (e.g., a VM 154) and an external client or network component in an external domain. The local VXLAN domain and the external domain may communicate via L3 (e.g., using core routers 120, edge switches 130, and/or TOR switches 120). For example, the external domain may be a VLAN domain, other non-VXLAN domain, or another different VXLAN domain that may be separated by a L3 network from the local VXLAN domain.

The system 200 includes a server 250 coupled to any combination of L2 and L3 networks 225. The server 250 comprises an improved or modified VTEP 252 and one or more VMs 254 coupled to the modified VTEP 252. The VMs 254 may be allocated to one or more VXLAN domains. The modified VTEP 252 is also coupled to an IP address database (DB) 256. The IP address DB 256 comprises an IP address range assigned to each of the VXLAN domains.

A L2/L3 network 225 may comprise L2/L3 switches/routers (not shown), such TOR switches (e.g., in one or more DCs) and edge switches/core routers (e.g., in one or more access/core networks). The L2/L3 switches/routers may be coupled to the Internet or any IP network. The external client at an external domain communicates with a VM 254 in the server 250 via the L2/L3 network 225. To enable VXLAN inter-domain communications between the VM 254 and the external client via the L2/L3 network(s), the VMs 254 that belong to the VXLAN domain are assigned IP addresses from an IP address range associated with that VXLAN domain. The IP address range is maintained in the IP address DB 256, and hence is know by the modified VTEP 252.

On the egress path from a VM 254 to a L2/L3 network 225, the modified VTEP 252 may receive an incoming packet or frame, for example an Ethernet frame 270. The Ethernet frame 270 may include an inner MAC destination address (DA) 271, an inner MAC source address (SA) 272 for the VM 254, an optional inner IEEE 802.1Q standard header 273, Ethernet payload 274, a cyclic redundancy check (CRC) field 275, or combinations thereof. The Ethernet frame 270 also comprises a destination IP address (not shown). The modified VTEP 252 checks whether the destination IP address and the source IP address fall into the IP address range of the same VXLAN domain in the IP address DB 256.

If the source and destination IP addresses fall into the same IP address range in the IP address DB 256, then the incoming packet is destined to a VM in the same VXLAN domain (for a VXLAN internal domain communications), e.g., in the same or different server. In this case, the modified VTEP 252 encapsulates the packet with a VXLAN header. For example, the modified VTEP 252 adds to an original Ethernet packet 270 a VXLAN header 260. The VXLAN header 260 includes an outer MAC DA 261, an outer MAC SA 262, an optional outer IEEE 802.1Q standard header 263, an outer IP DA 264, an outer IP SA 265, an outer User Datagram Protocol (UDP) 266, a VXLAN ID 267, or combinations thereof.

If the source and destination IP addresses fall into a different IP address range and the destination IP address is not a broadcast or multicast address, then the incoming packet is destined to an external client or component in an external domain, e.g., a VLAN domain, other non-VXLAN domain, or another differentVXLAN domain. In this case, the modified VTEP 252 does not encapsulate the incoming packet (e.g., does not add a VXLAN header 260 to the original Ethernet packet 270). Instead, the modified VTEP 252 replaces the source VM's MAC address (e.g., in the inner MAC SA 272) with the VTEP's MAC address to expose the VTEP's MAC address instead of the VM's MAC address to external switches/routers in the L2/L3 network 225. This substantially mitigates MAC table overflow in the switches/routers.

The modified VTEP 252 may also receive a packet or frame on the ingress path from a L2/L3 network 225 to a VM 254. The modified VTEP 252 checks whether the packet carries a UDP port field. If the packet carries a UDP port field, then the modified VTEP 252 further checks the destination port number (e.g., the DA in the UDP port field). If the destination UDP port matches a UDP port assigned for a VXLAN, then the packet is determined to be a VXLAN encapsulated packet (which comprises a VXLAN header). In this case, the modified VTEP 252 decapsulates the packet by removing the VXLAN header before forwarding the packet to the VM 254.

If the packet does not carry a UDP port field or the destination UDP port does not match a UDP port assigned for a VXLAN, then the packet is not a VXLAN encapsulated packet (does not comprise a VXLAN header). In this case, the modified VTEP 252 does not decapsulate the packet but replaces a destination MAC address in the packet with the VM's MAC address that the packet is destined to. The modified VTEP 252 gets the VM's MAC address that matches a destination IP address in the packet, which indicates the same VM. After replacing the MAC address in the packet, the packet is forwarded to the corresponding VM 254.

In the case of communications within the same VXLAN domain, intermediate switches and routers in the L2/L3 network 225 need to know which VTEP to forward a packet to. When the modified VTEP 252 on the server 250 receives the packet, the modified VTEP 252 takes care of forwarding the packet to the destination VM 254 on the same server 250. In the case of communications between an external client and a VM in a VXLAN domain, the incoming packet from the external client does not carry a VXLAN header and is forwarded by intermediate switches and routers in the L2/L3 network 225 based on a destination VM's IP address. The scheme described above supports both cases.

Figure 3:
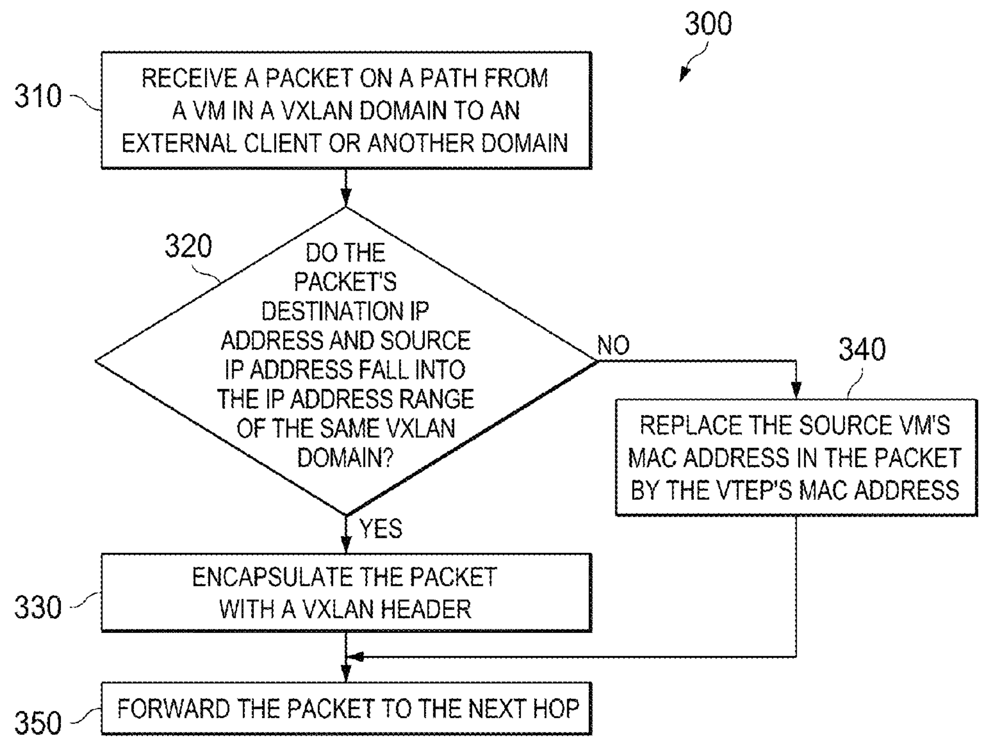
FIG. 3 is an embodiment method for VXLAN inter-domain communications.

FIG. 3 shows an embodiment method 300 for VXLAN inter-domain communications. The method 300 can be implemented by a VTEP, such as the modified VTEP 252, to handle a packet on a path from a VM in a VXLAN domain to an external client or another domain (e.g., from the VM 254 via the L2/L3 network 225 to an external client at an external domain). At step 310, a packet is received. At step 320, the method 300 determines whether the packet's destination IP address and source IP address fall into the IP address range of the same VXLAN domain. If the condition in step 320 is true (the destination IP address and the source IP address fall into the IP address range of the same VXLAN domain), then the method 300 proceeds to step 330. Otherwise, the method 300 proceeds to step 340. The method 300 may also check at step 320 whether the packet's destination IP address is a multicast or broadcast IP address, and proceeds to step 330 if this condition or the condition in step 320 is true or proceeds to step 340 otherwise. At step 330, the packet is encapsulated with a VXLAN header. For example, an incoming Ethernet frame 270 is encapsulated with a VXLAN header 260. At step 340, the source VM's MAC address in the packet is replaced by the VTEP's MAC address. At step 350, the packet is forwarded to the next hop, e.g., at a L2/L3 network or towards the external client or another domain.

Figure 4:
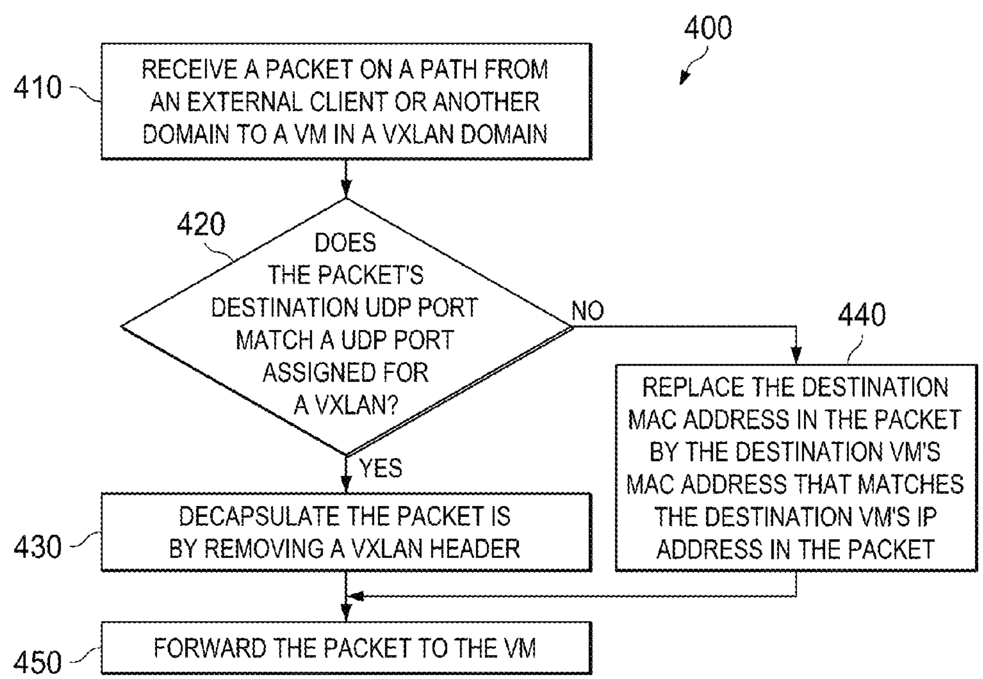
FIG. 4 is another embodiment method for VXLAN inter-domain communications.

FIG. 4 shows another embodiment method 400 for VXLAN inter-domain communications. The method 400 can be implemented by a VTEP, such as the modified VTEP 252, to handle a packet on a path from an external client or another domain and a VM in a VXLAN domain (e.g., from external client at an external domain coupled via the L2/L3 network 225 to the VM 254). At step 410, a packet is received. At step 420, the method 400 determines whether the packet's destination UDP port matches a VXLAN assigned UDP port. If the condition in step 420 is true, then the method 400 proceeds to step 430. Otherwise, the method 400 proceeds to step 440. At step 430, the packet is decapsulated by removing a VXLAN header. For example, a VXLAN header 260 is removed from the packet to obtain an original Ethernet frame 270. At step 440, the destination MAC address in the packet is replaced by the destination VM's MAC address that matches the destination VM's IP address in the packet. At step 450, the packet is forwarded to the destination VM.

The system 200 and methods 300 and 400 reduce cost of DC deployment, since the added functionality to support VXLAN inter-domain communications is incorporated at the VTEP within the server, for example as opposed to using an external gateway or component to achieve the same functionality. The system and methods also provide improved scalability, where the functionality is realized using intelligent logic (e.g., software) embedded in the VTEP, for example instead of directing the traffic to the gateway or external component. The schemes herein also avoid unnecessary processing overhead of adding VXLAN header and removing the VXLAN header for each packet in communications between a VXALN domain and an external client, component, or domain.

Figure 5:
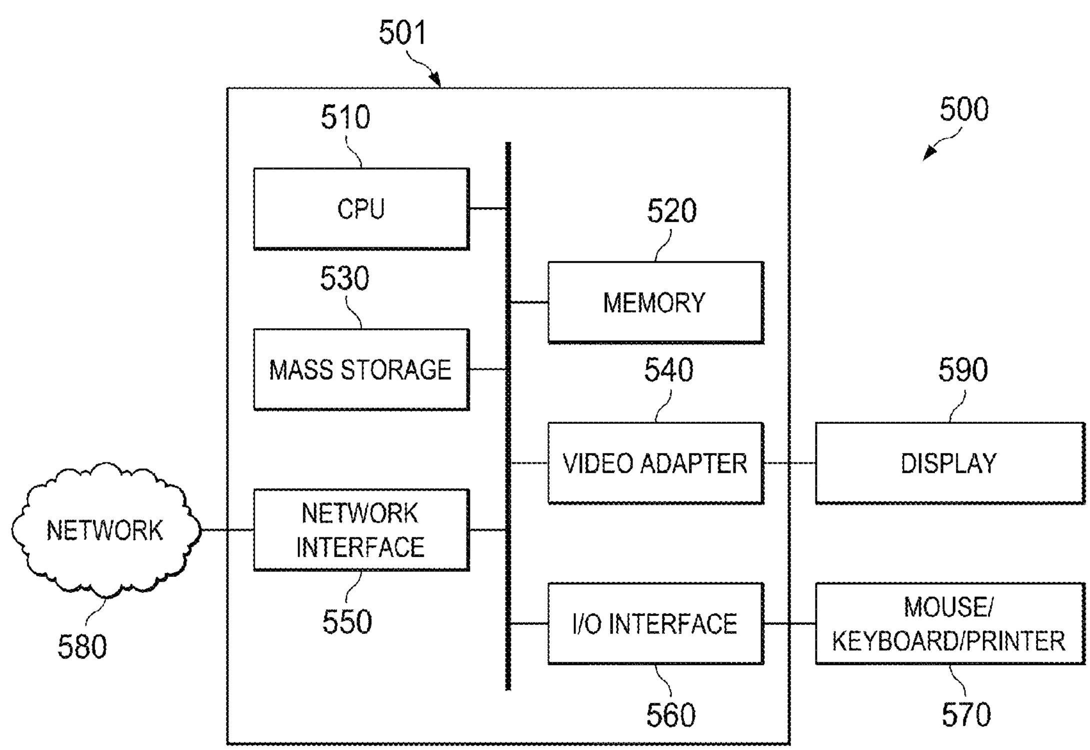
FIG. 5 is a processing system that can be used to implement various embodiments.

FIG. 5 is a block diagram of a processing system 500 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 500 may comprise a processing unit 501 equipped with one or more input/output devices, such as a speaker, microphone, mouse, touchscreen, keypad, keyboard, printer, display, and the like. The processing unit 501 may include a central processing unit (CPU) 510, a memory 520, a mass storage device 530, a video adapter 540, and an I/O interface 560 connected to a bus. The bus may be one or more of any type of several bus architectures including a memory bus or memory controller, a peripheral bus, a video bus, or the like.

The CPU 510 may comprise any type of electronic data processor. The memory 520 may comprise any type of system memory such as static random access memory (SRAM), dynamic random access memory (DRAM), synchronous DRAM (SDRAM), read-only memory (ROM), a combination thereof, or the like. In an embodiment, the memory 520 may include ROM for use at boot-up, and DRAM for program and data storage for use while executing programs. In embodiments, the memory 520 is non-transitory. The mass storage device 530 may comprise any type of storage device configured to store data, programs, and other information and to make the data, programs, and other information accessible via the bus. The mass storage device 530 may comprise, for example, one or more of a solid state drive, hard disk drive, a magnetic disk drive, an optical disk drive, or the like.

The video adapter 540 and the I/O interface 560 provide interfaces to couple external input and output devices to the processing unit. As illustrated, examples of input and output devices include a display 590 coupled to the video adapter 540 and any combination of mouse/keyboard/printer 570 coupled to the I/O interface 560. Other devices may be coupled to the processing unit 501, and additional or fewer interface cards may be utilized. For example, a serial interface card (not shown) may be used to provide a serial interface for a printer.

The processing unit 501 also includes one or more network interfaces 550, which may comprise wired links, such as an Ethernet cable or the like, and/or wireless links to access nodes or one or more networks 580. The network interface 550 allows the processing unit 501 to communicate with remote units via the networks 580. For example, the network interface 550 may provide wireless communication via one or more transmitters/transmit antennas and one or more receivers/receive antennas. In an embodiment, the processing unit 501 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:

receiving, by a Virtual eXtensible Local Area Network (VXLAN) Tunnel End Point (VTEP) in a server, a data packet from a virtual machine (VM) in the server, the data packet including a source media access control (MAC) address of the VM, a source internet protocol (IP) address of the VM, a MAC address of the destination endpoint, and an IP address of the destination endpoint;

determining, by the VTEP, that the data packet is not part of a VXLAN internal domain communications for the VM;

selectively replacing, by the VTEP, the source MAC address in the data packet with a MAC address of the VTEP without masking the source IP address of the VM to obtain a modified data packet when the data packet is not part of the VXLAN internal domain communications, wherein the modified data packet specifies the MAC address of the VTEP and the source IP address of the VM; and forwarding the modified data packet to an external component.

2. The method of claim 1, wherein the MAC address of the VM is replaced without performing VXLAN encapsulation or decapsulation on the data packet.

3. The method of claim 1 further comprising:

receiving a packet on a path from one of a plurality of VMs in the VXLAN domain to an external client or another domain;

determining whether a destination IP address of the packet and a source IP address of the packet fall into an IP address range of the same VXLAN domain or whether the destination IP address is a broadcast or multicast IP address;

encapsulating the packet with a VXLAN header when the destination IP address and the source IP address in the packet fall into an IP address range of the same VXLAN domain or when the destination IP address is a broadcast or multicast IP address; and replacing a source MAC address of a source VM in the packet with a MAC address of the VTEP when the destination IP address and the source IP address in the packet do not fall into an IP address range of the same VXLAN domain and when the destination IP address is not a broadcast or multicast IP address.

4. The method of claim 1, further comprising:

receiving a packet on a path from an external client or another domain to one of a plurality of VMs in the VXLAN domain;

determining whether the packet has an UDP header and the destination User Datagram Protocol (UDP) port in the packet matches a VXLAN assigned UDP port;

decapsulating the packet by removing a VXLAN header when the packet has an UDP header and the destination UDP port in the packet matches a VXLAN assigned UDP port; and replacing a destination MAC address in the packet with a MAC address of a destination VM when the packet does not have an UDP header or the packet has an UDP header but the destination UDP port in the packet does not match a VXLAN assigned UDP port.

5. The method of claim 4, wherein the MAC address of the destination VM is matched to a destination IP address of the same VM in the packet.

6. The method of claim 1, wherein the packet is received or forwarded via a Layer Two (L2) or Layer Three (L3) network, a L2 or L3 switch, or a L2 or L3 router between the VXLAN domain and the external component.

7. An apparatus for enabling communications between a Virtual eXtensible Local Area Network (VXLAN) domain and an external component, the apparatus comprising:

a VXLAN Tunnel End Point (VTEP);

one or more virtual machines (VMS) associated with the VXLAN domain and coupled to the VTEP; and an Internet Protocol (IP) address database (DB) coupled to the VTEP and comprising an IP address range assigned to the VXLAN domain, wherein the VTEP is configured to receive, from a first VM in the one or more VMs, a data packet including a source media access control (MAC) address of the first VM and a source internet protocol (IP) address of the first VM, to determine that the data packet is not part of a VXLAN internal domain communications for the one or more VMs, to selectively replace the source MAC address in the data packet with the MAC address of the VTEP without masking the source IP address of the first VM to obtain a modified data packet when the data packet is not part of the VXLAN internal domain communications, and to forward the modified data packet to an external component, wherein the modified data packet specifies the MAC address of the VTEP and the source IP address of the first VM.

8. The apparatus of claim 7, wherein the data packet is part of communications between a VXLAN domain and an external component or another domain when the data packet is forwarded on an egress path from one of the VMs in the VXLAN domain and comprises a destination IP address and a source IP address that do not fall into an IP address range assigned to the same VXLAN domain and when the data packet does not comprise an IP broadcast or multicast address.

9. The apparatus of claim 7, wherein the data packet is part of communications between a VXLAN domain and an external component or another domain when the data packet is forwarded on an ingress path to one of the VMs in the VXLAN domain and the data packet comprises a destination User Datagram Protocol (UDP) port that does not match a VXLAN assigned UDP port.

10. The apparatus of claim 7, wherein the VTEP is further configured to encapsulate or decapsulate an incoming packet that is part of a VXLAN internal domain communications.

11. The apparatus of claim 10, wherein the incoming packet is part of a VXLAN internal domain communications when the incoming packet is forwarded on an egress path from one of the VMs in the VXLAN domain and when the incoming packet comprises a destination IP address and a source IP address that fall into an IP address range assigned to the same VXLAN domain or comprises an IP broadcast or multicast address.

12. The apparatus of claim 10, wherein the incoming packet is part of a VXLAN internal domain communications when the incoming packet is forwarded on an ingress path to one of the VMs in the VXLAN domain and comprises a destination User Datagram Protocol (UDP) port that matches a VXLAN assigned UDP port.

13. The apparatus of claim 10, wherein the incoming packet is encapsulated by adding to the incoming packet a VXALN header or is decapsulated by removing from the incoming packet the VXLAN header, and wherein the VXALN header includes an outer MAC destination address (DA), an outer MAC source address (SA), an optional outer IEEE 802.1Q standard header, an outer IP DA, an outer IP SA, an outer User Datagram Protocol (UDP), and a VXLAN ID.

14. The apparatus of claim 7, wherein the packet comprises an Ethernet frame including an inner MAC destination address, an inner MAC source address, an optional inner IEEE 802.1Q standard header, Ethernet payload, and a cyclic redundancy check (CRC) field.

15. The apparatus of claim 7, wherein the VTEP is coupled to a Layer Two (L2) or Layer Three (L3) network, a L2 or L3 switch, or a L2 or L3 router positioned between the VXLAN domain and the external component.

16. The apparatus of claim 7, wherein the external component is located in a VLAN domain, a second VXLAN domain, or another domain different than the VXLAN domain.

17. A Virtual eXtensible Local Area Network (VXLAN) Tunnel End Point (VTEP) component comprising:

a processor; and a computer readable storage medium storing programming for execution by the processor, the programming including instructions to:

receive a data packet from a virtual machine (VM) in a server, the data packet including a source media access control (MAC) address of the VM and a source internet protocol (IP) address of the VM;

determine that the data packet is not part of a VXLAN internal domain communications for the VM;

selectively replace the source MAC address of the VM in the data packet with a MAC address of the VTEP without masking the source IP address of the VM to obtain a modified data packet when the data packet is not part of the VXLAN internal domain communications, wherein the modified data packet specifies the MAC address of the VTEP and the source IP address of the VM; and forward the modified data packet to an external component.

18. The VTEP component of claim 17, wherein the programming includes further instructions to:

receive a packet on a path from one of a plurality of VMs in the VXLAN domain to an external client or another domain;

determine whether a destination Internet Protocol (IP) address and a source IP address in the packet fall into an IP address range of the same VXLAN domain or whether the destination IP address is a broadcast or multicast IP address;

encapsulate the packet with a VXLAN header when the destination IP address and the source IP address in the packet fall into an IP address range of the same VXLAN domain or when the destination IP address is a broadcast or multicast IP address; and replace a source MAC address of a source VM in the packet with a MAC address of the VTEP when the destination IP address and the source IP address in the packet do not fall into an IP address range of the same VXLAN domain and when the destination IP address is not a broadcast or multicast IP address.

19. The VTEP component of claim 17, wherein the programming includes further instructions to:

receive a packet on a path from an external client or another domain to one of a plurality of VMs in the VXLAN domain;

determine whether a destination User Datagram Protocol (UDP) port in the packet matches a VXLAN assigned UDP port;

decapsulate the packet by removing a VXLAN header when the destination UDP port in the packet matches a VXLAN assigned UDP port; and replace a destination MAC address in the packet with a MAC address of a destination VM when the destination UDP port in the packet does not match a VXLAN assigned UDP port, wherein the MAC address of the destination VM matches a destination IP address of the same VM in the packet.

* * * * *